(No Model.)
W. T. MESSINGER.
CHECK VALVE.
No. 346,600. Patented Aug. 3, 1886.
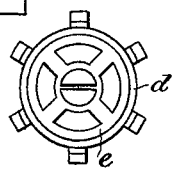
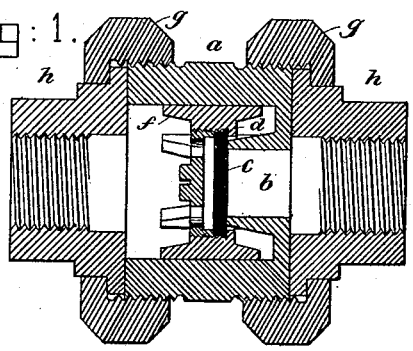
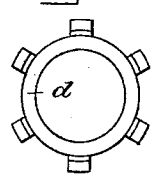
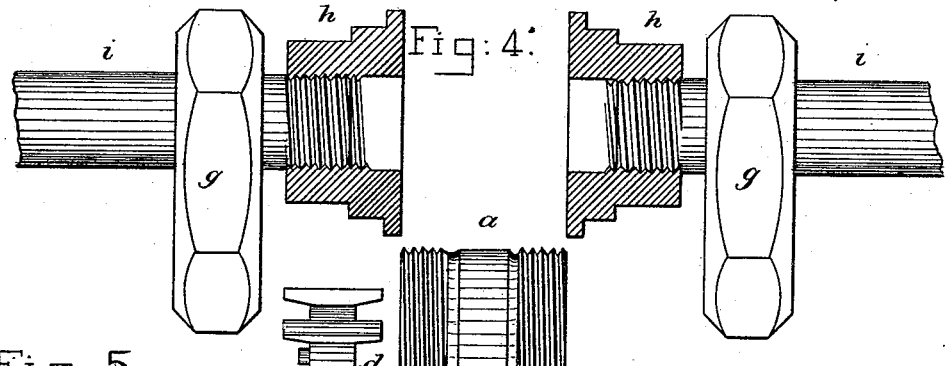
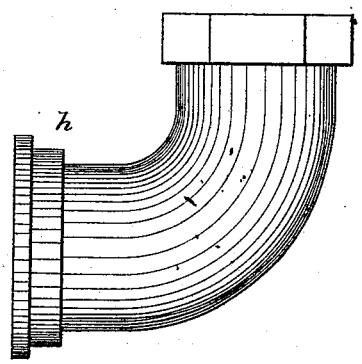
Witnesses
John F. Nelson
John F. C. Print Kert
Inventor
William T. Messinger
by Crosby & Gregory
Attys.

UNITED STATES PATENT OFFICE.

WILLIAM T. MESSINGER, OF CAMBRIDGE, MASSACHUSETTS.

CHECK-VALVE.

SPECIFICATION forming part of Letters Patent No. 346,600, dated August 3, 1886.

Application filed November 26, 1884. Serial No. 148,878. (No model.)

*To all whom it may concern:*

Be it known that I, WILLIAM T. MESSINGER, of Cambridge, county of Middlesex, State of Massachusetts, have invented an Improvement in Check-Valves, of which the following description, in connection with the accompanying drawings, is a specification, like letters on the drawings representing like parts.

My invention is embodied in a check-valve for limiting the flow of a fluid to one direction. The check-valve consists, essentially, of a case or shell having an inlet-passage of sufficient size to accommodate the flow of fluid desired, the said passage terminating in a valve-seat surrounded by the main chamber, which, as shown in this instance, constitutes a guide in which the valve proper has a longitudinal sliding movement.

The valve proper consists, essentially, of a disk or diaphragm, preferably of somewhat yielding material, supported in a frame provided with a guide, shown in this instance as consisting of projections co-operating with the walls of the guide-chamber around the valve-seat, there being sufficient space around the valve and between the guide projections to permit the flow of fluid when the valve is unseated.

The valve-seat projects toward the valve, the yielding portion or diaphragm of which is exposed to the back-pressure of the fluid controlled by the valve, and is thus pressed closely in its seat, sealing the passage tightly without the necessity of accurate fitting between the valve and seat.

In providing buildings with piping for heating and other purposes the pipes are usually put together with right-hand-threaded screws throughout the building, from which arrangement it results that if for any reason a piece of pipe has to be removed the entire piping beyond this point has to be unscrewed. In order to obviate this objection, where the piping is provided with a check-valve in accordance with this invention, the valve-casing is screw-threaded at both ends and connected by coupling-pieces with the piping at either side of it, and thus may be readily disconnected from the piping without disturbing the remainder of the piping. The coupling-piece at one end of the casing forms a stop for the valve, and when the casing is uncoupled and removed from the pipe the valve proper may be readily removed therefrom, if desired.

Figure 1 is a longitudinal section of a check-valve embodying this invention; Figs. 2 and 3, opposite end elevations of the valve; Fig. 4, an elevation, partly in section, showing the valve-casing removed from the piping and the valve proper removed from the casing, as may be required for repairs; Fig. 5, a longitudinal section showing a modified form of casing, and Fig. 6 an elevation of an elbow-fitting adapted to be coupled to the casing of the check-valve.

The valve-casing $a$ is provided at one end with an inlet-passage, $b$, which terminates in a valve-seat projecting into and surrounded by the main portion of the chamber $a$, the internal bore of which is greater than the external diameter of the raised seat and passage $b$. The valve proper, $c$, consists of a disk or diaphragm, which will usually be composed of rubber or other somewhat yielding or flexible material, the said disk being supported at its edges in an annular frame or ring, $d$, in which it is secured by a nut, $e$, preferably provided with openings, as shown in Figs. 1 and 2, permitting the fluid to press directly upon the disk $c$ when the pressure is less in the inlet-passage $b$ than on the other side of the valve, so as to force it into the closest possible engagement with the valve-seat. The ring $d$ is provided with external guide projections, $f$, which fit within the chamber $a$ and guide the valve in its longitudinal movement toward and from its seat, the space between the said projections and between the ring $d$ and inner wall of the casing $a$ being sufficient for the passage of the fluid when the valve is unseated by the pressure of the said fluid in the passage $b$.

The casing $a$ is threaded at each end to receive coupling-nuts $g$, by which it may be connected with coupling-pieces $h$ at the end of the casing. The coupling-piece $h$ at the end of the casing opposite the inlet-passage $b$ serves as a stop to limit the movement of the valve from its seat, the projections $f$ engaging the said coupling-piece and arresting the said valve in the casing when there is ample space for the flow of the fluid around the valve and between the said projections, which are longer than the width of the ring in the direction of its movement, as best shown in Fig. 4.

When the couplings g are unscrewed, as shown in Fig. 4, the case a may be detached from the pipes, and the valve then is free to slip out from the said casing, thus affording access to the valve and seat for the purpose of cleaning and repairing the same, if required. The coupling-piece h may be a portion of any desired kind of pipe-fitting, it being shown, for instance in Fig. 6, as a portion of an elbow-fitting, thus enabling the check-valve to be readily applied at an angle in the piping.

When the check-valve is to be employed at or near the end of the piping, it may be constructed as shown in Fig. 5, the case being threaded at or near the inlet end to connect directly with the piping, and being threaded at its other end to receive a ring, k, which serves as a stop for the movement of the valve in the case a, the said ring itself serving as a discharge-passage, or receiving within it a discharge-pipe, m, as may be desired.

By permitting the fluid to press directly on the disk or diaphragm c the latter makes a tight fit on its seat, thereby obviating the grinding or careful fitting required when a metal valve engages a metal seat.

I claim—

1. The valve-casing provided with a raised or projecting valve-seat, combined with a valve composed of a rigid ring or frame and yielding disk fixed at its edges therein, and acted upon within its edges by the fluid controlled by the valve, substantially as described.

2. A check-valve composed of a casing or chamber having an inlet-passage terminating in a valve-seat, combined with a valve comprising a ring provided with guide projections longer than the width of the ring, co-operating with the said chamber, the space between the said guide projections permitting the flow of fluid when the valve is unseated, substantially as described.

3. The casing or chamber having an inlet-passage terminating in a valve-seat, combined with the valve consisting of a ring provided with projections engaging and guided by the inner wall of the chamber, and a yielding disk confined at its edges in the said ring, and having its surfaces exposed to the pressure of the fluid controlled by the valve, substantially as described.

4. The valve-casing provided with a raised or projecting valve-seat, and a valve comprising a ring or frame arranged in said casing, and provided with guide projections longer than the width of the ring, and co-operating with the said casing, the space between the said guide projections permitting the flow of fluid when the valve is inserted, combined with a coupling serving to limit the movement of the valve in one direction, substantially as described.

In testimony whereof I have signed my name to this specification in the presence of two subscribing witnesses.

WM. T. MESSINGER.

Witnesses:
JOS. P. LIVERMORE,
W. H. SIGSTON.